F. J. JUNKER.
LOAD SUSTAINER.
APPLICATION FILED MAR. 9, 1916.
1,202,530.
Patented Oct. 24, 1916.
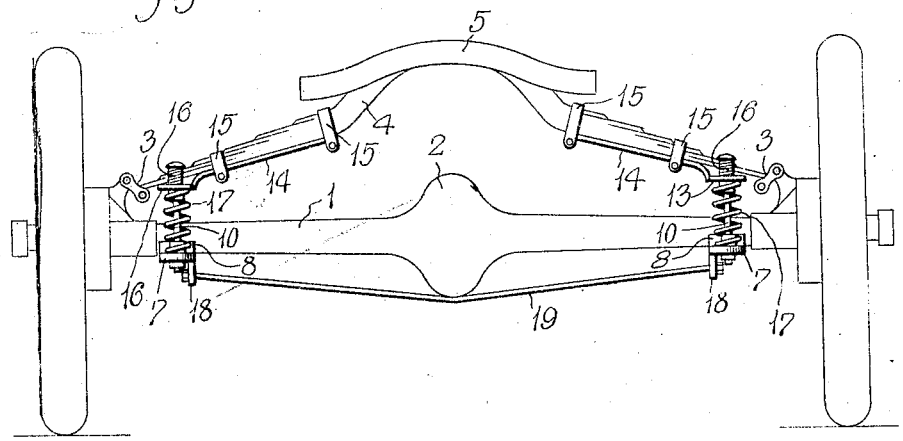
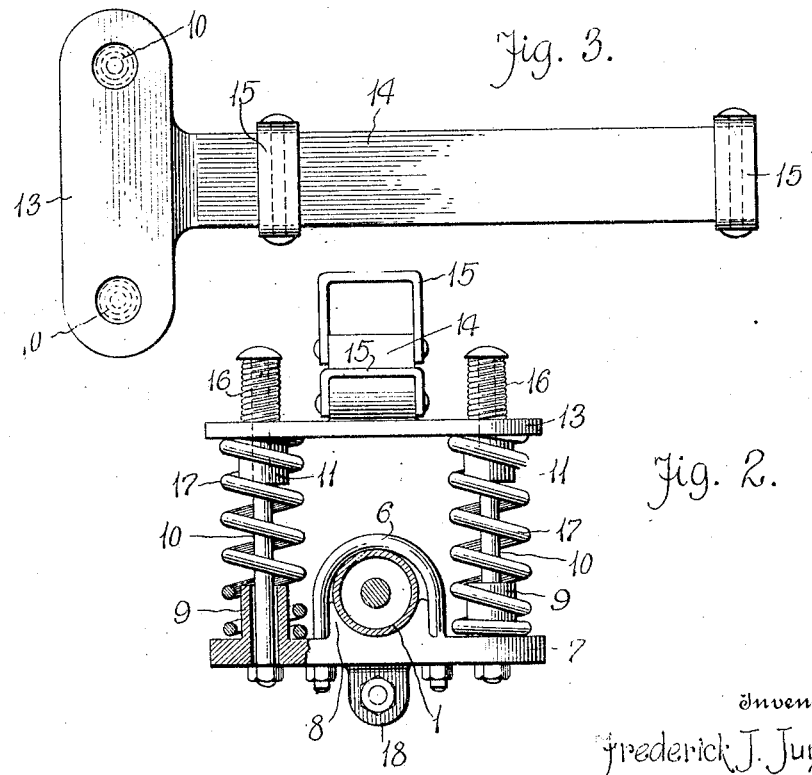
Witnesses
Chas. W. Stauffige
Karl H. Butler
Inventor
Frederick J. Junker,
By
Attorneys

UNITED STATES PATENT OFFICE.

FREDERICK J. JUNKER, OF DETROIT, MICHIGAN.

LOAD-SUSTAINER.

1,202,530.

Specification of Letters Patent.   Patented Oct. 24, 1916.

Application filed March 9, 1916.   Serial No. 83,006.

*To all whom it may concern:*

Be it known that I, FREDERICK J. JUNKER, a citizen of the United States of America, residing at Detroit, in the county of Wayne and State of Michigan, have invented certain new and useful Improvements in Load-Sustainers, of which the following is a specification, reference being had therein to the accompanying drawings.

When substituting a truck or commercial automobile body for pleasure or touring automobile bodies in order that the same chassis or running gear may be utilized for trucking purposes, it is desirable to increase the strength or carrying qualities of the rear spring or springs of the automobile, to sustain such loads as the spring or springs may be subjected to, and my invention aims to provide a novel load sustainer that can be easily and quickly attached to the rear axle casing of an automobile and the springs thereof, to increase the sustaining power of the springs.

My invention further aims to provide a load sustaining device that can be advantageously used in connection with the chassis of the well known Ford automobile, and the parts of the device are constructed with a view of reducing the cost of manufacture and at the same time retain the features by which safety, durability, simplicity and ease of assembling are secured.

With such ends in view my invention resides in the novel construction, combination and arrangement of parts to be hereinafter described and then claimed.

Reference will now be had to the drawing, wherein—

Figure 1 is a rear elevation of an automobile chassis provided with a load sustainer in accordance with my invention; Fig. 2 is an enlarged side elevation of a portion of the load sustainer, partly broken away and partly in section, and Fig. 3 is an enlarged plan of a spring member.

In the drawings, 1 denotes a rear axle casing having a differential part 2, shackles 3 and a leaf spring 4 supporting a rear end bearing or automobile frame 5. Connected to the rear axle casing 1, contiguous to the ends thereof, by yokes 6 or similar fastening means, are transverse bearing plates 7 having seats 8 for the casing 1. The ends of the bearing plates 7 are apertured and provided with guide thimbles 9. Extending through the thimbles 9 of the bearing plates 7 are tie rods 10, preferably in the form of bolts provided with nuts. The tie rods 10 extend through thimbles 11 carried by the apertured ends of transverse heads 13 forming part of spring members 14 and these spring members are connected to the ends of the leaf springs 4 by straps 15. The tie rods 10 extend above the heads 13 of the spring members 14 and are encircled by rod sustaining springs 16, while the tie rods 10 and the thimbles 9 and 11 are encircled by coiled load sustaining springs 17.

The bearing plates 7 are provided with apertured lugs 18 connected by a tie rod 19, which extends under the differential part 2 of the rear axle casing 1 and assist in supporting the same, besides connecting the bearing plates 7 of the rear axle casing. Ordinarily the differential part 2 of the rear axle casing is of separable parts, and should parts of the rear axle casing become detached, the tie rod 19 holds the parts together until repairs are made.

By reference to Fig. 1, it will be observed that the transverse heads 13 are disposed at an angle to the spring members 14 whereby the heads 13 will be in a horizontal plane parallel with the bearing plates 7, thus insuring proper end contact of the load sustaining spring 17 with the head 13 and the bearing plates 7. The members 14 increase the strength or carrying qualities of the leaf spring 4, and when said spring is subjected to a load and the springs 17 placed under compression, the springs 16 support the tie rod 10 and prevent the same from rattling in the bearing plates 7 and the heads 13.

It may not be necessary to use the tie rod 19 or the thimbles 9 and 11 in connection with the bearing plates 7 and the heads 13, and while in the drawing there is illustrated a preferred embodiment of my invention, it is to be understood that the structural elements are susceptible to such changes, in size, shape and manner of assemblage, as fall within the scope of the appended claims:

What I claim is:—

1. In an automobile, the combination with a rear axle casing and a spring above said casing, of members attached to and disposed longitudinally of the lower faces of said spring at the ends of said spring and above said rear axle casing, plates attached to said casing, rods extending through said plates and said members, and load sustaining springs encircling said rods between said plates and said members.

2. In an automobile, the combination with a rear axle casing, and a spring above said casing, of members clamped on the lower faces of said spring and having the outer ends thereof above said axle casing, spaced fastening means holding said members longitudinally of said spring, plates attached to said casing, rods extending through said plates and said members, load sustaining springs encircling said rods between said plates and said members, and rod sustaining springs above said members adapted to hold said rods when said load sustaining springs are under compression.

3. In an automobile, the combination with a rear axle casing, and a spring above said casing, of members clamped on the lower faces of said spring at the ends thereof and extending inwardly along said spring, plates attached to said casing, a rod connecting said plates, rods extending through said plates and said members, and load sustaining springs encircling the last mentioned rods between said plates and said members.

4. A load sustaining device for automobiles, comprising members adapted for attachment to and movable with a vehicle spring when flexed in either direction, spaced means holding said members longitudinally of said spring, plates adapted for attachment to an axle portion of a vehicle, tie rods extending through said plates and said members, load sustaining springs between said plates and said members, and means on said members supporting said tie rods when said springs are under compression by a load.

5. A load sustaining device for vehicles, comprising members adapted for attachment to and movable with a vehicle spring when flexed in either direction, spaced means holding said members longitudinally of said spring, plates adapted for attachment to a rear axle casing at the ends thereof, a rod connecting said plates, rods extending through said plates and said members, coiled compression springs encircling the last mentioned rods between said plates and said members, and coiled springs encircling the last mentioned rods above said members and adapted to hold said rods when said compression springs are under compression by a load.

In testimony whereof I affix my signature in presence of two witnesses.

FREDERICK J. JUNKER.

Witnesses:
ANNA M. DORR,
KARL H. BUTLER.